United States Patent
Hallmark et al.

(10) Patent No.: US 7,613,207 B2
(45) Date of Patent: Nov. 3, 2009

(54) SECURING TELEPHONY COMMUNICATIONS BETWEEN REMOTE AND ENTERPRISE ENDPOINTS

(75) Inventors: Addis Eli Hallmark, McKinney, TX (US); Marc Coiner Ayres, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 10/982,205

(22) Filed: Nov. 3, 2004

(65) Prior Publication Data

US 2006/0092945 A1    May 4, 2006

(51) Int. Cl.
*H04J 3/16* (2006.01)
*H04J 3/22* (2006.01)

(52) U.S. Cl. .............. 370/466; 370/352; 370/355; 370/395.2; 370/401; 726/11; 726/13; 726/14; 726/26

(58) Field of Classification Search ............... 370/395.2
See application file for complete search history.

(56) References Cited

U.S. PATENT DOCUMENTS

| | | | |
|---|---|---|---|
| 6,333,931 B1 | 12/2001 | LaPier et al. | 370/385 |
| 6,363,065 B1 | 3/2002 | Thornton et al. | 370/352 |
| 6,614,781 B1 | 9/2003 | Elliott et al. | 370/352 |
| 6,665,293 B2 | 12/2003 | Thornton et al. | 370/352 |
| 6,870,841 B1* | 3/2005 | Brown et al. | 370/389 |
| 7,016,340 B1* | 3/2006 | McKinion | 370/352 |
| 2002/0040439 A1* | 4/2002 | Kellum | 713/200 |
| 2002/0141386 A1* | 10/2002 | Minert et al. | 370/352 |
| 2003/0161297 A1* | 8/2003 | Noda et al. | 370/352 |
| 2004/0266420 A1* | 12/2004 | Malinen et al. | 455/421 |
| 2005/0240994 A1* | 10/2005 | Burcham et al. | 726/15 |

* cited by examiner

*Primary Examiner*—Rafael Pérez-Gutiérrez
*Assistant Examiner*—German Viana Di Prisco
(74) *Attorney, Agent, or Firm*—Baker Botts L.L.P.

(57) ABSTRACT

A system for securing telephony communications between an enterprise telephony endpoint and a remote telephony endpoint includes an isolated packet-based network, an exposed packet-based network, and an isolation device. The isolated packet-based network has a plurality of enterprise telephony endpoints. The exposed packet-based network is coupled to a public packet-based network and has a call management device that can receive an unsecured session request from a remote telephony endpoint coupled to the public packet-based network, determine that the unsecured session request identifies one of the enterprise telephony endpoints, and establish a media link between the remote telephony endpoint and the isolation device. The isolation device is coupled between the isolated packet-based network and the exposed packet-based network and can receive unsecured media associated with the media link, translate the unsecured media to reduce the likelihood of harmful code communicated by the remote telephony endpoint from reaching the identified enterprise telephony endpoint, and transmit the translated media to the isolated packet-based network.

28 Claims, 2 Drawing Sheets

SECURING TELEPHONY COMMUNICATIONS BETWEEN REMOTE AND ENTERPRISE ENDPOINTS

TECHNICAL FIELD OF THE INVENTION

The present invention relates generally to telephony communications, and, more particularly, to securing telephony communications between remote and enterprise endpoints.

BACKGROUND OF THE INVENTION

Enterprises are increasingly adopting packet-based telephony solutions for personal and business telephone networks. These solutions work well for calls within enterprises, but significant difficulties arise when establishing communications sessions with endpoints located outside of an enterprise network.

SUMMARY OF THE INVENTION

In accordance with the present invention, techniques for securing telephony communications between remote and enterprise endpoints are provided. According to particular embodiments, these techniques allow remote endpoints to establish communications sessions with enterprise endpoints. In particular, an isolation device may isolate enterprise endpoints from an exposed call management device. A firewall coupled to the exposed call management device may forward requests for communications sessions to the exposed call management device, while media associated with communications sessions may be forwarded to the isolation device to remove any harmful code included with the media before sending the media to the intended enterprise endpoint.

According to a particular embodiment, a system for securing telephony communications between an enterprise telephony endpoint and a remote telephony endpoint includes an isolated packet-based network, an exposed packet-based network, and an isolation device. The isolated packet-based network has a plurality of enterprise telephony endpoints. The exposed packet-based network is coupled to a public packet-based network and has a call management device that can receive an unsecured session request from a remote telephony endpoint coupled to the public packet-based network, determine that the unsecured session request identifies one of the enterprise telephony endpoints, and establish a media link between the remote telephony endpoint and the isolation device. The isolation device is coupled between the isolated packet-based network and the exposed packet-based network and can receive unsecured media associated with the media link, translate the unsecured media to reduce the likelihood of harmful code communicated by the remote telephony endpoint from reaching the identified enterprise telephony endpoint, and transmit the translated media to the isolated packet-based network.

Embodiments of the invention provide various technical advantages. These techniques may allow enterprise telephony endpoints to communicate with remote telephony endpoints while providing security measures. According to particular embodiments, a portion of an enterprise network may be exposed to remote telephony endpoints, while the rest of the enterprise network is isolated from exposed elements in case harmful code, such as viruses, Trojan horses, or other types of harmful executable programs, is communicated to the enterprise network from remote telephony devices. Thus, harmful code may be contained and any destructive effects of the harmful code may be limited. Results may include reduced cost and improved productivity. Furthermore, these techniques may increase the viability of packet-based telephony solutions for enterprise networks by creating a secure solutions for interacting with remote telephony devices.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
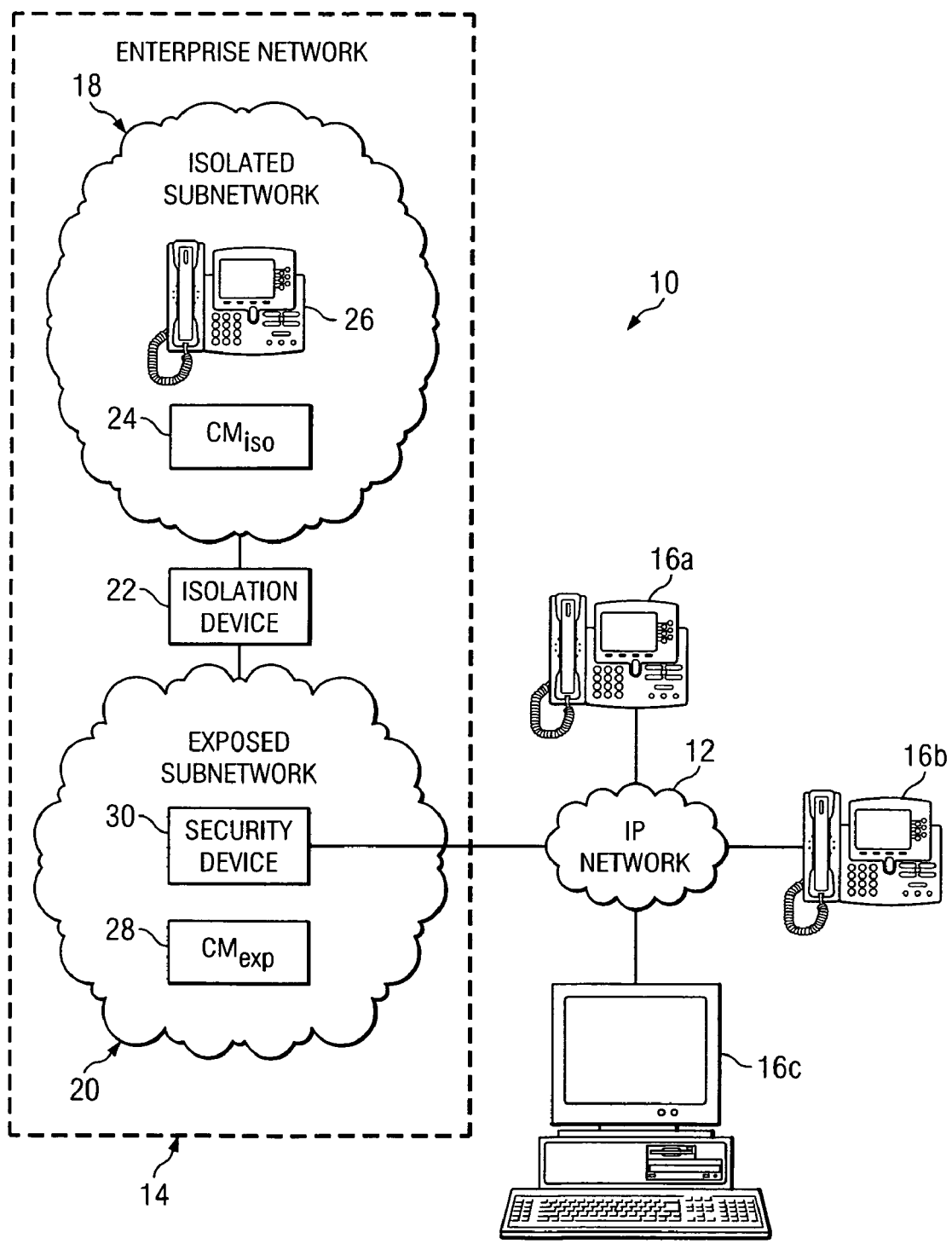
FIG. 1 illustrates a communication system that supports secure telephony communications between remote and enterprise endpoints.

FIG. 1 illustrates a communication system, indicated generally at 10, that includes a packet-based network 12 and an enterprise network 14. In the embodiment illustrated, packet-based network 12 couples with remote endpoints 16, and enterprise network 14 includes isolated subnetwork 18 and exposed subnetwork 20 interconnected by isolation device 22. Isolated subnetwork 18 includes isolated call management device 24 and isolated enterprise endpoint 26. Exposed subnetwork 20 includes exposed call management device 28 and firewall 30. In general, communications sessions may be established between remote endpoints 16 and enterprise endpoints, including isolated enterprise endpoint 26. More particularly, one of remote endpoints 16 may communicate a request for a communications session to exposed call management device 28. Firewall 30 may forward signaling associated with the communications session to exposed call management device 28 and media associated with the communications session to isolation device 22. Isolation device 22 may extract any harmful code embedded in the media or posing as media before forwarding the media to isolated enterprise endpoint 26. Thus, elements of communication system 10 may cooperate to protect isolated subnetwork 18 from harmful code while still allowing remote endpoints 16 to initiate and participate in communications sessions.

Packet-based network 12 represents any suitable collection of hardware and controlling logic to support packet-based communications between devices. Packet-based network 12 provides an infrastructure to interconnect devices within system 10. In a particular embodiment, packet-based network 12 may include one or multiple networks, such as packet-based local area networks (LANs), wide area networks (WANs), and/or any other appropriate form of network. Thus, according to particular embodiments, packet-based network 12 supports Internet protocol (IP). However, packet-based network 12 may support any appropriate protocol or protocols. Furthermore, packet-based network 12 may include all or portions of various public and private networks such as the Internet.

Enterprise network 14 represents any suitable collection of hardware and a controlling logic to support packet-based communications between devices. Similar to packet-based network 12, enterprise network 14 provides an infrastructure to interconnect devices within system 10. In a particular embodiment, enterprise network 12 may include one or multiple networks, such as packet-based LANs, WANs, and/or any other appropriate form of network. Thus, according to particular embodiments, enterprise network 14 supports IP. However, enterprise network 14 may support any appropriate protocol or protocols.

Remote endpoints 16 each represent packet-based communications equipment, including hardware and any appropriate controlling logic, for providing telephony services over packet-based networks including packet-based network 12 and enterprise network 14. Remote endpoints 16 may communicate using IP. For example, remote endpoints 16 may include voice over IP (VoIP) telephones, such as telephones supporting H.323 and/or session initiation protocol (SIP). However, remote endpoints 16 include any appropriate communication devices using any suitable protocols. Thus, in the embodiment illustrated, remote endpoint 16a and 16b represent VoIP telephones while remote endpoint 16c represents a desktop computer. Note that remote endpoints 16 are labeled "remote" because these devices are located outside enterprise network 14.

Isolated subnetwork 18 and exposed subnetwork 20 represent portions of enterprise network 14. Thus, isolated subnetwork 18 and exposed subnetwork 20 each include various enterprise elements. Note that isolated subnetwork 18 as well as various elements within isolated subnetwork 18 are labeled "isolated" because remote endpoint 16 communicates with elements of isolated subnetwork 18 through isolation device 22. Furthermore, note that exposed subnetwork 20 as well as various elements within exposed subnetwork 20 are labeled "exposed" because remote endpoint 16 may communicate directly with elements of exposed subnetwork 18 without communications first traveling through isolation device 22. While specific enterprise elements are included in isolated subnetwork 18 and exposed subnetwork 20, various enterprise elements and numbers of particular enterprise elements may be included. Furthermore, in addition to the illustrated elements, other elements may be included. For example, gateways may be utilized by isolated subnetwork 18 and/or exposed subnetwork 20.

Isolation device 22 represents any suitable collection of hardware and controlling logic operable to extract harmful code from media to isolate isolated subnetwork 18 from exposed subnetwork 20. Thus, for example, isolation device 22 may include a switched facility such as an interface that converts between packet-based and circuit-switched protocols. For example, isolation device 22 may convert media between IP and a T-carrier protocol such as T1. Alternatively or in addition, isolation device 22 may operate as a firewall.

Isolated call management device 24 represents equipment, including hardware and any appropriate controlling logic, for managing communications sessions involving isolated enterprise endpoint 26. For example, isolated call management device 24 may support VoIP communications using any of various protocols such as signaling connection control point (SCCP) protocol, session initiation protocol (SIP), media gateway control protocol (MGCP), H.323, and/or any other appropriate protocol for VoIP.

Isolated enterprise endpoint 26 represents packet-based communications equipment, including hardware and any appropriate controlling logic, for providing telephony services over packet-based networks including packet-based network 12 and enterprise network 14. Isolated enterprise endpoint 26 may communicate using IP. For example, isolated enterprise endpoint 26 may include a VoIP telephone, such as a telephone supporting H.323 and/or SIP. However, isolated enterprise endpoint 26 includes any appropriate communication device using any suitable protocol. Thus, in the embodiment illustrated, isolated enterprise endpoint 26 represents a VoIP telephone. However, isolated enterprise endpoint 26 may represent another type of endpoint, such as a desktop computer. Furthermore, while one isolated enterprise endpoint 26 is illustrated, it should be understood that multiple isolated enterprise endpoints 26 may be included in isolated subnetwork 18.

Exposed call management device 28 represents equipment, including hardware and any appropriate controlling logic, for managing communications sessions involving isolated enterprise endpoint 26. For example, exposed call management device 28 may support signaling for VoIP communications using any of various protocols such as SCCP protocol, SIP, MGCP, H.323, and/or any other appropriate protocol for VoIP. According to particular embodiments, exposed call management device 28 may be configured to operate as an intercluster trunk in association with isolated call management device 24 and isolated enterprise endpoint 26.

Firewall 30 represents hardware and/or appropriate controlling logic capable of securing exposed subnetwork 20. According to particular embodiments, firewall 30 monitors network traffic and determines whether to accept or reject communications sent to firewall 30 from packet-based network 12. Furthermore, firewall 30 may also direct communications to appropriate elements within exposed subnetwork 20. Thus, firewall 30 may enforce security policies, such as a policy established for a particular communications session. For example, firewall 30 may direct signaling associated with a communications session to exposed call management device 28 and media associated with the same communications session to isolation device 22 for forwarding to an appropriate isolated enterprise endpoint 26.

In operation, elements of enterprise network 14 may operate to secure telephony communications between isolated enterprise endpoint 26 and remote endpoints 16. In particular, elements of enterprise network 14 may allow communications sessions with isolated enterprise endpoint 26 to be initiated by remote endpoint 16. For example, a request for a communications session may be communicated to firewall 30 for forwarding to exposed call management device 28. Exposed call management device 28 may initiate steps to establish the communications session with isolated enterprise endpoint 26.

According to particular embodiments, exposed call management device 28 may act as an intercluster trunk in association with isolated call management device 24 and isolated enterprise endpoint 26. Alternatively, exposed call management device 28 may operate independently to process signaling associated with isolated enterprise endpoints 26. Exposed call management device 28 may provide number to address resolution and/or address to address resolution for allowing remote endpoint 16 to communicate with isolated enterprise endpoints 26. According to particular embodiments, an identifier of isolated enterprise endpoint 26 may be communicated from exposed call management device 28 to firewall 30 and/or isolation device 22 in response to a request received at exposed call management device 28. In particular embodiments, the identifier is a non-routable IP address used within enterprise network 14. For example, a non-routable IP address of isolated enterprise endpoint 26 may be communicated to firewall 30 and/or isolation device 22. Note, however, that routable IP addresses may be used.

Firewall 30 may utilize the identifier as appropriate. For example, firewall 30 may associate the identifier with the communication session and/or isolated enterprise endpoint 16. For example, firewall 30 may maintain configuration information associated with various communications sessions, and the configuration information associated with isolated enterprise endpoint 26 may include the identifier. After a communications session is established, firewall 30 may route signaling associated with the communications session to exposed call management device 28 and route media associated with the communications session to isolation device 22. Firewall 30 may communicate the identifier along with the media to isolation device 22 as appropriate. For example, firewall 30 may insert into media packets the IP address of isolated enterprise endpoint 26. Furthermore, firewall 30 may reject unexpected or otherwise unacceptable packets of information communicated by remote endpoints 16.

Isolation device 22 may receive the media and the identifier. Isolation device 22 may forward the media to the identified isolated enterprise endpoint 26 using the identifier. Isolation device 22 may also reject packets of information communicated to isolation device 22. For example, isolation device 22 may reject communications from exposed call management device 28 not intended for isolated call management device 24. Isolation device 22 may also reject media not communicated from firewall 30. Isolation device 22 may also receive signaling associated with communications sessions.

According to particular embodiments, before forwarding media and/or signaling to elements of isolated subnetwork 18 such as isolated call management device 24 and/or isolated enterprise endpoint 26, isolation device 22 ensures that the media does not include harmful code. For example, isolation device 22 may translate the media by switching the media using a switched interface. For example, isolation device 22 may first switch the media from a packet-based link to a switched link, and then from the switched link to the packet-based link. According to particular embodiments, isolation device 22 may utilize a loopback cable to switch the media. Furthermore, isolation device 22 may convert the media between a first protocol and a second protocol as appropriate. For example, isolation device 22 may first convert the media from IP to T1, and then from T1 to IP before sending the media over a T1 link. Switching the media may operate to strip the media of harmful code. However, isolation device 22 may strip harmful code from the media in various other ways, such as by utilizing an antivirus or other software security system.

Thus, elements of enterprise network 14 may secure telephony communications between remote endpoint 16 and isolated enterprise endpoint 26. A request for a communications session may be directed to exposed call management device 28, while media associated with the communications session may be forwarded to isolated enterprise endpoint 26 through isolation device 22. Elements of enterprise network 14 may allow remote endpoint 16 to initiate and establish communications sessions. However, elements of exposed subnetwork 20 may provide security measures so that remote endpoint 16 is prevented from damaging elements of isolated subnetwork 18 by submitting harmful codes to enterprise network 14. For example, harmful code may be contained within exposed subnetwork 20 so that any damage caused by harmful code may be limited in its scope to elements within exposed subnetwork 20.

Figure 2:
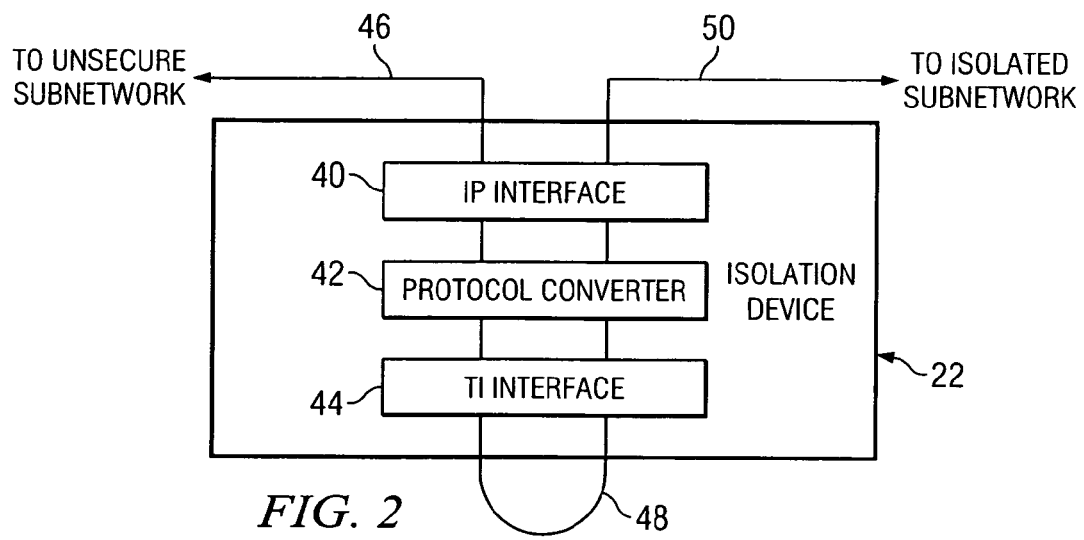
FIG. 2 is a block diagram illustrating functional components of an isolation device.

FIG. 2 is a block diagram illustrating functional components of one embodiment of isolation device 22. In the embodiment illustrated, isolation device 22 includes an IP interface 40, a protocol converter 42, and a T1 interface 44. These functional components can operate to secure telephony communications between remote endpoints 16 and isolated enterprise endpoint 26.

IP interface 40 communicates information to and receives information from devices coupled to isolation device 22. As illustrated, IP interface 40 may couple to IP links 46 and 50. IP links 46 and 50 represent mediums for communication of packet-based IP telephony communications. More specifically, IP link 46 may couple isolation device 22 to elements within exposed subnetwork 20, and IP link 50 may couple isolation device 22 to elements within isolated subnetwork 18. Thus, IP interface 40 includes any suitable hardware and controlling logic used to communicate information to or from elements coupled to isolation device 22.

Protocol converter 42 converts communications between protocols, such as IP and T1 protocols. Thus, protocol converter 42 represents any suitable combination of hardware, software, and controlling logic for converting media communicated through isolation device 22 between protocols.

T1 interface 44 communicates information to and receives information from devices coupled to isolation device 22. As illustrated, T1 interface 44 may couple to T1 link 48. T1 link 48 represents a medium for communication of T1 telephony communications. More specifically, as illustrated, T1 link 48 may couple isolation device 22 to itself. For example, T1 link 48 may include a loop back cable. Thus, T1 interface 44 includes any suitable hardware and controlling logic used to communicate information to or from elements coupled to isolation device 22, including isolation device 22 itself.

In operation, signaling and/or media communicated to isolation device 22 from exposed subnetwork 20 may be received at IP interface 40. For example, IP packets may be received at IP interface 40 and transmitted to protocol converter 42. Protocol converter 42 may convert the media from IP to T1 protocol before forwarding the converted media to T1 interface 44. T1 interface 44 may transmit the media in T1 protocol through link 48, which, as illustrated, is a loop back cable. The media transmitted through link 48 may be received at T1 interface 44 and transmitted from T1 interface 44 to protocol converter 42 for conversion back to IP. After the media is converted back to IP format, the media may be transmitted to isolated subnetwork 18 through IP interface 40.

Thus, isolation device 22 may effectively strip harmful code out of media communicated by remote endpoint 16 by transmitting the media over T1 link 48. Using these techniques, isolation device 22 may prevent harmful code from reaching isolated enterprise endpoints 26.

While a particular embodiment of isolation device 22 has been illustrated and discussed, note that various other embodiments may be utilized. For example, isolation device 22 may operate as a firewall that is operable to identify and prevent identified harmful code from reaching isolated enterprise endpoint 26 by scanning the media for known viruses and other harmful code.

Figure 3:
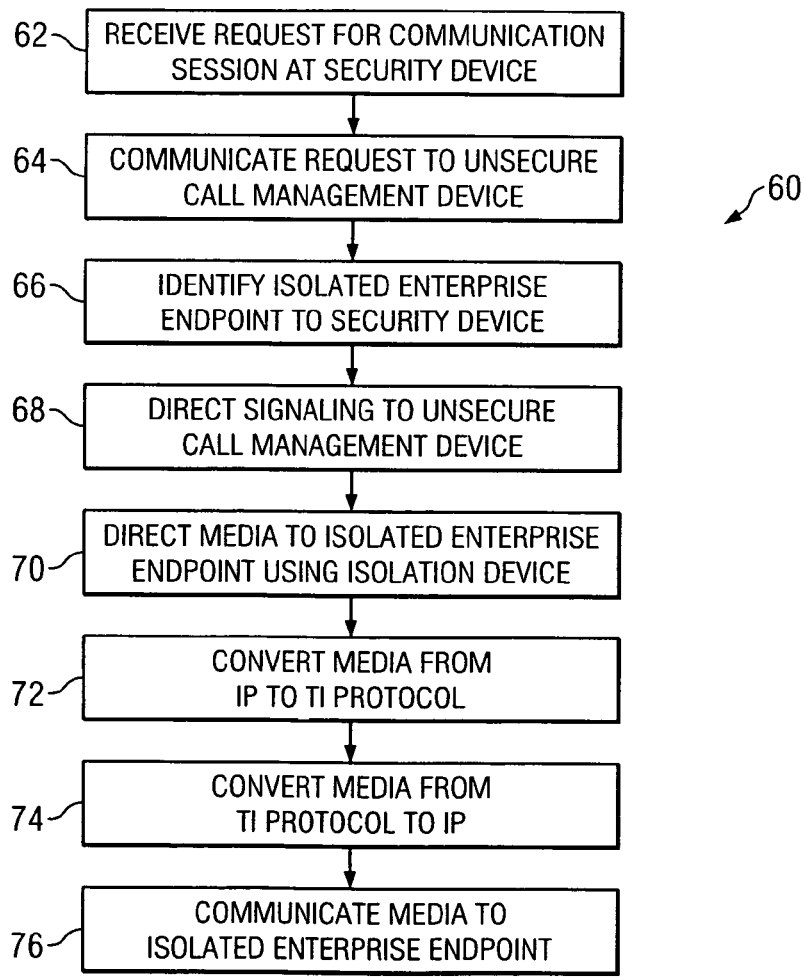
FIG. 3 is a flowchart illustrating a method for securing telephony communications between remote and enterprise endpoints.

FIG. 3 is a flowchart illustrating a method 60 for securing telephony communications between remote endpoints 16 and isolated enterprise endpoints 26. Firewall 30 receives a request for a communications session at step 62 and communicates the request to exposed call management device 28 at step 64. For example, the request may be communicated by one of remote endpoints 16.

After receiving the request, exposed call management device 28 identifies the called device to firewall 30 at step 66.

For example, exposed call management device 28 may perform number to address resolution to identify an IP address associated with isolated enterprise endpoint 26 if isolated enterprise endpoint 26 is the called device. Furthermore, exposed call management device 28 may communicate with isolated call management device 24 and/or isolated enterprise endpoint 26 through isolation device 22 to set up the communications session with the calling remote endpoint 16 and/or isolated call management device 24.

Firewall 30 directs signaling associated with the communications session to exposed call management device 28 at step 68. For example, signaling communicated from remote endpoint 16 to firewall 30 may be forwarded to exposed call management device 28. Firewall 30 directs media associated with the communications session to isolated enterprise endpoint 26 using isolation device 22 at step 70. Firewall 30 may also communicate an identifier of isolated enterprise endpoint 26, such as the IP address of isolated enterprise endpoint 26, to isolation device 22. For example, according to particular embodiments, firewall 30 may insert the IP address into media packets.

Isolation device 22 converts the media from IP to T1 protocol at step 72 before converting the media from T1 protocol to IP at step 74. Isolation device 22 converts the media between protocols so that the media may be transmitted through a switched medium. Thus, isolation device 22 may operate as a switched interface. Transmitting the media through a switched interface may operate to strip harmful code from the media. Thus, isolation device 22 may operate to prevent harmful code from reaching isolated subnetwork 18 when isolation device 22 communicates the media to isolated enterprise endpoint 26 at step 76.

Note that in particular embodiments, signaling associated with communications sessions may also be directed to isolation device 22. For example, signaling may be directed to isolation device 22 for forwarding to isolated enterprise endpoint 26 or isolated call management device 24. Isolation device 22 may also translate signaling to eliminate harmful code.

Thus, method 60 represents one embodiment of a method for securing telephony communications between enterprise network 14 and remote endpoints 16. In particular, method 60 illustrates actions that may be taken by elements of system 10 to route signaling through exposed call management 28 while routing media through isolation device 22. Using these techniques, enterprise network 14 may allow simple remote endpoint 16 to establish communications sessions with enterprise elements while isolating enterprise elements to prevent harmful code transmitted by remote endpoint 16 to damage extensive portions of enterprise network 14.

The preceding flowchart illustrates a particular method for securing telephony communications between enterprise network 14 and remote end point 16. However, this flowchart illustrates only one exemplary method of operation, and communication system 10 contemplates devices using any suitable techniques, elements, and applications for performing similar methods. Thus, many of the steps in the flowchart may take place simultaneously and/or in different orders than as shown. In addition, the devices may use methods with additional steps or fewer steps, so long as the methods remain appropriate.

Although the present invention has been described in several embodiments, a myriad of changes and modifications may be suggested to one skilled in the art, and it is intended that the present invention encompass such changes and modifications as fall within the present appended claims.

What is claimed is:

1. A system for securing telephony communications between an enterprise telephony endpoint and a remote telephony endpoint, comprising:
   an isolated packet-based network having a plurality of enterprise telephony endpoints:
   an exposed packet-based network coupled to a public packet-based network and having a call management device operable to receive an unsecured session request from a remote telephony endpoint coupled to the public packet-based network, to determine that the unsecured session request identifies one of the enterprise telephony endpoints, and to establish a media link between the remote telephony endpoint and an isolation device; and
   the isolation device coupled between the isolated packet-based network and the exposed packet-based network, wherein the isolation device includes a packet-based interface operable to couple to the isolated packet-based network and the exposed packet-based network, and a switched interface coupled to a loopback cable, the isolation device operable to receive unsecured media associated with the media link, to transmit the unsecured media on the loopback cable to translate the unsecured media to reduce the likelihood of harmful code communicated by the remote telephony endpoint from reaching the identified enterprise telephony endpoint, and to transmit the translated media to the isolated packet-based network.

2. The system of claim 1, wherein the isolation device is further operable to convert the unsecured media between a first protocol associated with the packet-based interface and a second protocol associated with the switched interface.

3. The system of claim 2, wherein the first protocol is Internet Protocol (IP) and the second protocol is T1.

4. The system of claim 1, wherein the isolation device is further operable to receive unsecured signaling associated with the media link, to translate the unsecured signaling to reduce the likelihood of harmful code communicated by the remote telephony endpoint from reaching the identified enterprise telephony endpoint, and to transmit the translated signaling to the isolated packet-based network.

5. The system of claim 4, wherein:
   the isolation device is further operable to transmit the translated signaling to a second call management device in the isolated packet-based network; and
   the second call management device is operable to process the translated signaling to support the identified enterprise telephony endpoint.

6. The system of claim 4, wherein the isolation device is further operable to transmit the translated media and the translated signaling directly to the identified enterprise telephony endpoint in the isolated packet-based network.

7. The system of claim 1, further comprising a firewall operable to couple to the exposed packet-based network, to receive the unsecured session request and the unsecured media transmitted from the remote telephony endpoint, to direct the unsecured session request to the call management device, and to direct the unsecured media to the isolation device.

8. A method for securing telephony communications between an enterprise telephony endpoint and a remote telephony endpoint, comprising:
   receiving at a call management device in an exposed packet-based network an unsecured session request from a remote telephony endpoint coupled to a public packet-based network;

determining that the unsecured session request identifies one of a plurality of enterprise telephony endpoints in an isolated packet-based network;

establishing a media link between the remote telephony endpoint and an isolation device, wherein the isolation device includes a packet-based interface operable to couple to the isolated packet-based network and the exposed packet-based network, and a switched interface coupled to a loopback cable;

receiving unsecured media associated with the media link at the isolation device;

looping the unsecured media through the loopback cable to remove the harmful code;

translating the unsecured media to reduce the likelihood of harmful code communicated by the remote telephony endpoint from reaching the identified enterprise telephony endpoint; and transmitting the translated media from the isolation device to the isolated packet-based network.

9. The method of claim 8, wherein the isolation device is further operable to convert the unsecured media between a first protocol associated with the packet-based interface and a second protocol associated with the switched interface.

10. The method of claim 9, wherein the first protocol is Internet Protocol (IP) and the second protocol is T1.

11. The method of claim 8, further comprising:

receiving unsecured signaling associated with the media link at the isolation device;

translating the unsecured signaling to reduce the likelihood of harmful code communicated by the remote telephony endpoint from reaching the identified enterprise telephony endpoint; and transmitting the translated signaling from the isolation device to the isolated packet-based network.

12. The method of claim 11, further comprising:

transmitting the translated signaling from the isolation device to a second call management device in the isolated packet-based network; and processing the translated signaling at the second call management device to support the identified enterprise telephony endpoint.

13. The method of claim 11, further comprising transmitting the translated media and the translated signaling directly from the isolation device to the identified enterprise telephony endpoint in the isolated packet-based network.

14. The method of claim 8, further comprising:

receiving the unsecured session request and the unsecured media transmitted from the remote telephony endpoint at a firewall coupled to the exposed packet-based network;

directing the unsecured session request from the firewall to the call management device; and directing the unsecured media from the firewall to the isolation device.

15. A computer readable medium encoded with logic for securing telephony communications between an enterprise telephony endpoint and a remote telephony endpoint, the logic operable when executed to:

receive at a call management device in an exposed packet-based network an unsecured session request from a remote telephony endpoint coupled to a public packet-based network;

determine that the unsecured session request identifies one of a plurality of enterprise telephony endpoints in an isolated packet-based network;

establish a media link between the remote telephony endpoint and an isolation device, wherein the isolation device includes a packet-based interface operable to couple to the isolated packet-based network and the exposed packet-based network, and a switched interface coupled to a loopback cable;

receive unsecured media associated with the media link at the isolation device;

loop the unsecured media through the loopback cable to remove the harmful code;

translate the unsecured media to reduce the likelihood of harmful code communicated by the remote telephony endpoint from reaching the identified enterprise telephony endpoint; and transmit the translated media from the isolation device to the isolated packet-based network.

16. The computer readable medium of claim 15, wherein the isolation device is further operable to convert the unsecured media between a first protocol associated with the packet-based interface and a second protocol associated with the switched interface.

17. The computer readable medium of claim 16, wherein the first protocol is Internet Protocol (IP) and the second protocol is T1.

18. The computer readable medium of claim 15, the logic further operable when executed to:

receive unsecured signaling associated with the media link at the isolation device;

translate the unsecured signaling to reduce the likelihood of harmful code communicated by the remote telephony endpoint from reaching the identified enterprise telephony endpoint; and transmit the translated signaling from the isolation device to the isolated packet-based network.

19. The computer readable medium of claim 18, the logic further operable when executed to:

transmit the translated signaling from the isolation device to a second call management device in the isolated packet-based network; and process the translated signaling at the second call management device to support the identified enterprise telephony endpoint.

20. The computer readable medium of claim 18, the logic further operable when executed to transmit the translated media and the translated signaling directly from the isolation device to the identified enterprise telephony endpoint in the isolated packet-based network.

21. The computer readable medium of claim 15, the logic further operable when executed to:

receive the unsecured session request and the unsecured media transmitted from the remote telephony endpoint at a firewall coupled to the exposed packet-based network;

direct the unsecured session request from the firewall to the call management device; and direct the unsecured media from the firewall to the isolation device.

22. A system for securing telephony communications between an enterprise telephony endpoint and a remote telephony endpoint, comprising:

means for receiving at a call management device in an exposed packet-based network an unsecured session request from a remote telephony endpoint coupled to a public packet-based network;

means for determining that the unsecured session request identifies one of a plurality of enterprise telephony endpoints in an isolated packet-based network;

means for establishing a media link between the remote telephony endpoint and an isolation device, wherein the isolation device includes a packet-based interface operable to couple to the isolated packet-based network and the exposed packet-based network, and a switched interface coupled to a loopback cable;

means for receiving unsecured media associated with the media link at the isolation device;

means for looping the unsecured media through the loopback cable to remove the harmful code;

means for translating the unsecured media to reduce the likelihood of harmful code communicated by the remote telephony endpoint from reaching the identified enterprise telephony endpoint; and means for transmitting the translated media from the isolation device to the isolated packet-based network.

23. The system of claim 22, wherein the isolation device is further operable to convert the unsecured media between a first protocol associated with the packet-based interface and a second protocol associated with the switched interface.

24. The system of claim 23, wherein the first protocol is Internet Protocol (IP) and the second protocol is T1.

25. The system of claim 22, further comprising:

means for receiving unsecured signaling associated with the media link at the isolation device;

means for translating the unsecured signaling to reduce the likelihood of harmful code communicated by the remote telephony endpoint from reaching the identified enterprise telephony endpoint; and means for transmitting the translated signaling from the isolation device to the isolated packet-based network.

26. The system of claim 25, further comprising:

means for transmitting the translated signaling from the isolation device to a second call management device in the isolated packet-based network; and means for processing the translated signaling at the second call management device to support the identified enterprise telephony endpoint.

27. The system of claim 25, further comprising means for transmitting the translated media and the translated signaling directly from the isolation device to the identified enterprise telephony endpoint in the isolated packet-based network.

28. The system of claim 22, further comprising:

means for receiving the unsecured session request and the unsecured media transmitted from the remote telephony endpoint at a firewall coupled to the exposed packet-based network;

means for directing the unsecured session request from the firewall to the call management device; and means for directing the unsecured media from the firewall to the isolation device.

* * * * *

UNITED STATES PATENT AND TRADEMARK OFFICE
CERTIFICATE OF CORRECTION

PATENT NO. : 7,613,207 B2 Page 1 of 1
APPLICATION NO. : 10/982205
DATED : November 3, 2009
INVENTOR(S) : Hallmark et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Nineteenth Day of October, 2010

David J. Kappos
*Director of the United States Patent and Trademark Office*